United States Patent
Quilliard

(10) Patent No.: US 12,384,456 B2
(45) Date of Patent: Aug. 12, 2025

(54) METHOD FOR CONTROLLING THE LATERAL POSITION OF A VEHICLE ON A TRAFFIC LANE

(71) Applicants: RENAULT S.A.S, Boulogne Billancourt (FR); NISSAN MOTOR CO., LTD., Yokohama (JP)

(72) Inventor: Raphael Quilliard, Massy (FR)

(73) Assignees: RENAULT S.A.S, Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 178 days.

(21) Appl. No.: 18/249,767

(22) PCT Filed: Sep. 23, 2021

(86) PCT No.: PCT/EP2021/076251
§ 371 (c)(1),
(2) Date: Apr. 20, 2023

(87) PCT Pub. No.: WO2022/083970
PCT Pub. Date: Apr. 28, 2022

(65) Prior Publication Data
US 2023/0391399 A1    Dec. 7, 2023

(30) Foreign Application Priority Data

Oct. 22, 2020    (FR) ........................... 2010820

(51) Int. Cl.
*B62D 6/10* (2006.01)
*B60W 30/12* (2020.01)
(Continued)

(52) U.S. Cl.
CPC ............. *B62D 6/10* (2013.01); *B62D 15/029* (2013.01); *G08G 1/167* (2013.01); *B60W 30/12* (2013.01);
(Continued)

(58) Field of Classification Search
CPC ........ B62D 6/10; B62D 15/029; G08G 1/167; B60W 30/12; B60W 50/14;
(Continued)

(56) References Cited

U.S. PATENT DOCUMENTS

| 10,583,839 B2 * | 3/2020 | Wu ........................ B60W 30/12 |
| 2005/0200467 A1 * | 9/2005 | Au .......................... B60Q 1/343 |
| | | 348/148 |

(Continued)

FOREIGN PATENT DOCUMENTS

| DE | 10 2011 076 418 A1 | 11/2012 |
| EP | 2 248 710 A1 | 11/2010 |

(Continued)

OTHER PUBLICATIONS

International Search Report mailed on Dec. 20, 2021 in PCT/EP2021/076251 filed on Sep. 23, 2021 (3 pages).

(Continued)

*Primary Examiner* — Phutthiwat Wongwian
*Assistant Examiner* — Susan E Scharpf
(74) *Attorney, Agent, or Firm* — Oblon, McClelland, Maier & Neustadt, L.L.P.

(57) ABSTRACT

A method for controlling the lateral position of a vehicle on a traffic lane includes: a first controlling of the vehicle following a first reference trajectory, alerting the driver if the lateral distance separating the vehicle from the edge of the traffic lane is less than a first threshold, then detecting a command applied to a steering wheel of the vehicle, then a second controlling of the vehicle following a second reference trajectory, the second trajectory being determined depending on the command applied to the steering wheel, and alerting the driver if the lateral distance separating the vehicle from the edge of the traffic lane is less than a second threshold, the second threshold being less than the first threshold.

10 Claims, 5 Drawing Sheets

(51) Int. Cl.
*B60W 50/14* (2020.01)
*B62D 15/02* (2006.01)
*G08G 1/16* (2006.01)

(52) U.S. Cl.
CPC ....... *B60W 50/14* (2013.01); *B60W 2050/143* (2013.01); *B60W 2540/18* (2013.01); *B60W 2552/53* (2020.02); *B60W 2554/801* (2020.02); *B60Y 2300/12* (2013.01)

(58) Field of Classification Search
CPC ....... B60W 2050/143; B60W 2540/18; B60W 2552/53; B60W 2554/801; B60Y 2300/12
See application file for complete search history.

(56) References Cited

U.S. PATENT DOCUMENTS

| | | | |
|---|---|---|---|
| 2005/0240335 A1* | 10/2005 | Schroder | B60W 30/16 180/170 |
| 2010/0138115 A1* | 6/2010 | Kageyama | B60R 21/0134 701/45 |
| 2011/0015850 A1* | 1/2011 | Tange | B60W 30/12 701/116 |
| 2015/0348418 A1* | 12/2015 | Pfeiffer | G08G 1/167 340/435 |
| 2018/0273052 A1* | 9/2018 | Ogura | G08G 1/167 |
| 2020/0180634 A1* | 6/2020 | Hammoud | G08G 1/163 |
| 2022/0324444 A1* | 10/2022 | Germain | B62D 15/025 |
| 2022/0366704 A1* | 11/2022 | Quilliard | B60W 30/12 |
| 2022/0410886 A1* | 12/2022 | Wallin | B60W 30/12 |

FOREIGN PATENT DOCUMENTS

| | | |
|---|---|---|
| EP | 3 379 516 A1 | 9/2018 |
| JP | 2012-3421 A | 1/2012 |
| JP | 2015-27837 A | 2/2015 |

OTHER PUBLICATIONS

Preliminary French Search Report dated Jul. 6, 2021 in French Application 2010820 filed on Oct. 22, 2020 (3 pages, with Translation of Categories).

* cited by examiner

METHOD FOR CONTROLLING THE LATERAL POSITION OF A VEHICLE ON A TRAFFIC LANE

TECHNICAL FIELD OF THE INVENTION

The invention relates to a method for controlling the lateral position of a vehicle on a traffic lane. The invention also relates to a motor vehicle comprising means for implementing such a control method.

PRIOR ART

Lane centering assist (LCA) systems are intended for driving and maintaining an autonomous or semi-autonomous vehicle in the center of the lane on which it travels. Documents DE102011076418 and EP 2248710 describe such systems.

These systems cooperate with detection means capable of identifying the lateral limits of the traffic lane and then determine an equidistant positioning of the vehicle between these two lateral limits, that is to say in the center of the traffic lane. The use of such systems may appear unnatural or inappropriate under certain driving configurations, such as, for example, when a truck is present in an adjacent lane or when offsetting the vehicle in the lane to create a passage for motorcycles or emergency vehicles. During these particular circumstances, the driver may wish to temporarily offset his vehicle while remaining in the same traffic lane.

"Flexible" assist systems are known in which the torque exerted by the driver on the steering wheel always has an influence on the position of the vehicle in the lane. The driver can thus apply a torque to the steering wheel to offset his vehicle toward an edge of the lane. During this maneuver, the assist system opposes the driver's demand to return the vehicle toward the center of the lane. Such resistance is uncomfortable, anxiety-inducing and can lead to positioning errors and/or to insufficient safety distances from the surrounding vehicles. Moreover, the eccentric positioning of the vehicle on the traffic lane causes the broadcast of alert messages imposed by the standards governing driving assist systems. Such alert messages are also anxiety-inducing and unsuitable.

Application WO03091813 also discloses a guide system for motor vehicles cooperating with a sensor capable of detecting surrounding objects in the adjacent traffic lanes. The lateral position of the vehicle is then adapted according to the tracking data of these objects. Such a method is complex to implement and is not satisfactory in all situations. For example, if the traffic is heavy, the system is then subject to numerous trajectory variations, which can cause an uncomfortable situation for the passengers.

PRESENTATION OF THE INVENTION

The object of the invention is to provide a lateral position control method that overcomes the above disadvantages and improves the control methods known from the prior art.

More precisely, one subject of the invention is a lateral position control method that is comfortable, simple to implement and reassuring.

SUMMARY OF THE INVENTION

The invention relates to a method for controlling the lateral position of a vehicle on a traffic lane, the control method comprising:

a first step automatically regulating the lateral position of the vehicle following a first reference trajectory, and
a first step of monitoring the lateral distance separating the vehicle from an edge of the traffic lane, the first monitoring step comprising a substep of alerting the driver if the lateral distance separating the vehicle from the edge of the traffic lane is less than or equal to a first threshold, then
a step of detecting a command applied to a steering wheel of the vehicle by a driver to shift the vehicle toward an edge of the traffic lane, then
stopping the first monitoring step,
a second step of automatically controlling the lateral position of the vehicle following a second reference trajectory, the second trajectory being determined according to the command applied to the steering wheel by the driver, and
a second step of monitoring the lateral distance separating the vehicle from an edge of the traffic lane, the second monitoring step comprising a substep of alerting the driver if the lateral distance separating the vehicle from the edge of the traffic lane is less than or equal to a second threshold, the second threshold being strictly less than the first threshold.

The control method can comprise a substep of calculating the first threshold according to a width of the traffic lane and according to a lateral speed of the vehicle on the traffic lane, and/or it can comprise a substep of calculating the second threshold according to a width of the traffic lane and according to a lateral speed of the vehicle on the traffic lane.

The control method can comprise a substep of stopping the alert given to the driver if the lateral distance separating the vehicle from the edges of the traffic lane is greater than or equal to a third threshold, the third threshold being strictly greater than the first threshold.

The first control step and/or the second control step can comprise:

a substep of calculating a first steering torque of the steered wheels of the vehicle,
a substep of calculating a gain, the gain being a decreasing function of a torque applied to the steering wheel by the driver,
a substep of calculating a second steering torque of the steered wheels of the vehicle by a multiplication of the first torque and of the gain.

The control method can comprise a step of verifying at least one criterion relating to said command, said step of automatically controlling the position of the vehicle following the second reference trajectory being implemented if and only if the at least one criterion is satisfied, the step of verifying at least one criterion comprising:

a substep of comparing a lateral deviation of the vehicle with respect to the first reference trajectory with a minimum lateral deviation threshold, and/or
a substep of comparing the lateral deviation of the vehicle with respect to the first reference trajectory with a maximum lateral deviation threshold, and/or
a substep of comparing a torque applied to the steering wheel of the vehicle with a minimum torque threshold, and/or
a substep of comparing the torque applied to the steering wheel of the vehicle with a maximum torque threshold.

The control method can comprise a step of determining a lateral offset of the vehicle with respect to the first reference trajectory subsequent to the command applied to the steering wheel by the driver, the second reference trajectory being defined according to the first reference trajectory and the lateral offset, the determination step comprising a detection of an increase then of a stabilization of a torque applied to the steering wheel by the driver and/or a detection of an increase and then of a stabilization of a state parameter of the vehicle.

The second control step can comprise:
- a step of calculating a reference state vector of the vehicle,
- a step of calculating an observed state vector of the vehicle,
- a step of calculating a setpoint of a steering angle of the steered wheels of the vehicle according to the difference between the reference state vector and the observed state vector,
- a transition step executed at the start of the second control step, the transition step comprising a replacement of the component of an observed state vector of the vehicle by a component calculated such that a steering angle setpoint of the steered wheels of the vehicle is equal to a current value of the steering angle of the steered wheels.

The control method can comprise:
- temporarily maintaining the second control step, then automatically,
- a third step of automatically controlling the position of the vehicle following the first reference trajectory.

The invention also relates to a computer program product comprising program code instructions recorded on a computer-readable medium for implementing the steps of the control method as defined above when said program is run on a computer.

Finally, the invention also relates to a motor vehicle comprising steered wheels connected to a steering wheel, means for detecting the environment of the vehicle, means for alerting a driver of the vehicle, and at least one computer configured to implement the control method as defined above.

PRESENTATION OF THE FIGURES

These subjects, features and advantages of the present invention will be explained in detail in the following description of a particular embodiment given in a nonlimiting manner with reference to the appended figures, in which.

DETAILED DESCRIPTION

Figure 1:
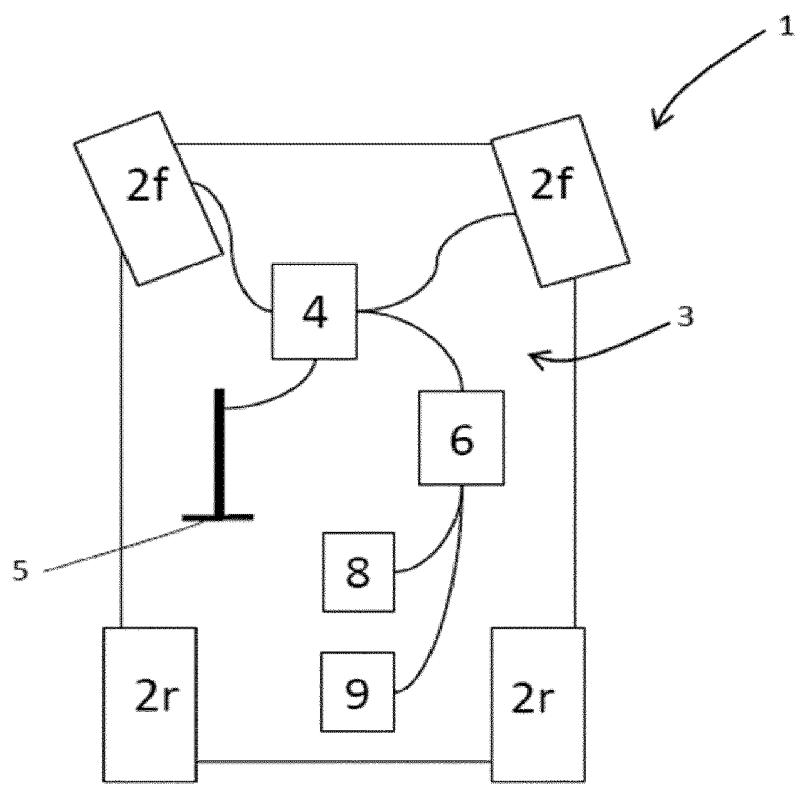
FIG. 1 is a schematic view of a motor vehicle according to one embodiment of the invention.

FIG. 1 schematically illustrates a motor vehicle 1 according to one embodiment of the invention. The vehicle 1 can be of any kind, in particular a passenger car, a utility vehicle, a truck or a bus. The vehicle 1 comprises two steered front wheels 2f and two rear wheels 2r. The orientation of the steered wheels 2f can be controlled by a steering system 3.

The steering system 3 comprises a steering device 4 in mechanical connection with the two front wheels 2f and a steering wheel 5 in mechanical connection with the steering device 4. The steering system 3 can also comprise an assisted steering module, for example integrated in the steering device 4. The steering system 3 further comprises an electronic control unit 6.

The vehicle 1 also comprises means 8 for detecting the environment of the vehicle 1, such as, for example, radars, and/or lidars and/or cameras. It also comprises means 9 for alerting the driver. These alert means can be any means aimed at alerting the driver's senses: for example visual alert means such as an indicator light or a screen able to display a symbol or a message. These alert means can also be audible or even vibratory alert means.

The electronic control unit 6 is electrically connected to the steering device 4, to the detection means 8 and to the alert means 9. It can also be connected directly or indirectly to other sensors of the vehicle, such as a steering wheel angle sensor, a speed sensor, a yaw sensor of the vehicle or else a sensor of torque exerted by the driver on the steering wheel 5.

The electronic control unit 6 comprises in particular a memory, a microprocessor and input/output interfaces for receiving data from other equipment of the vehicle 1 or for emitting data for the attention of other equipment of the vehicle 1. The memory of the electronic control unit is a medium for recording data on which there is recorded a computer program comprising program code instructions for implementing a method according to one embodiment of the invention. The microprocessor is able to execute this method. In particular, the electronic control unit 6 is able to send control orders to the steering device 4 via its input/output interface so as to apply a torque aimed at orienting the steered wheels 2f. Thus, the vehicle 1 is an autonomous or semi-autonomous vehicle, that is to say that it can be directed and maintained on a steering track without the intervention of a driver. The vehicle 1 can also be controlled in a conventional manner by a driver, by actuating the steering wheel. Note that, in this document, the "torque" applied to the steered wheels relates to the useful torque for orienting the steered wheels and thus directing the vehicle. This term therefore does not designate a useful engine torque for rotating the wheels so as to advance the vehicle.

Figure 2:
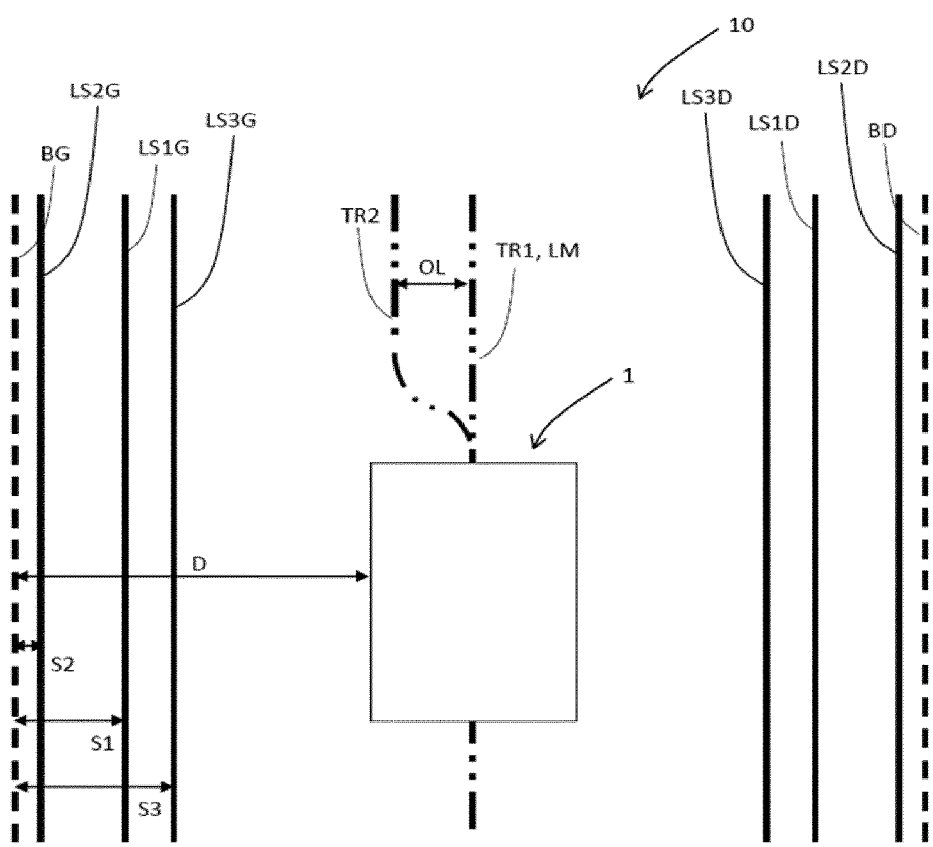
FIG. 2 is a schematic view of the vehicle on a traffic lane.

FIG. 2 illustrates the vehicle 1 traveling on a traffic lane 10. The traffic lane is intended to accommodate a single vehicle across its width. The traffic lane 10 is delimited to the left and to the right by two edges BG and BD. These edges can be materialized in the form of demarcation lines, such as, for example, continuous lines or broken lines of white or yellow color. In a variant, the edges BG and BD could simply correspond to the lateral ends of the traffic lane and be materialized by a sidewalk, an embankment, or simply by the edges of a road pavement. The road on which the vehicle 1 travels can comprise a plurality of traffic lanes positioned to the left and/or or to the right of the traffic lane 10.

Also shown in FIG. 2 are imaginary lines LS1G, LS2G, LS3G, LS1D, LS2D, LS3D, and LM. These lines are not materialized on the traffic lane but have simply been shown in order to clearly understand the invention. The lines LS1G, LS2G and LS3G are substantially parallel to the left edge BG and are distant therefrom respectively by thresholds S1, S2 and S3. Likewise, the lines LS1D, LS2D and LS3D are substantially parallel to the right edge BD and are distant therefrom respectively by the thresholds S1, S2 and S3. The line LM extends equidistantly from the edges BG and BD.

In other words, the line LM is a median line of the traffic lane 10. Note that the traffic lane illustrated in FIG. 2 is a straight line. However, the invention could also be implemented when the traffic lane describes a curve or a bend.

The detection means 8 are able to identify the edges BG and BD of the traffic lane 10 and to determine a lateral position of the vehicle 1 on this traffic lane. The lateral position of the vehicle can be, for example, determined by quantifying the lateral distance D (or lateral deviation D) separating a left edge of the vehicle from the left edge BG of the traffic lane.

In this document, the longitudinal axis is defined as the axis of the traffic lane at the height of the vehicle 1. The longitudinal axis can therefore be substantially parallel to the edges BG and BD. Assuming that the edges BG and BD would not be strictly parallel, the longitudinal axis can designate a bisector of these two lines at the height of the vehicle 1. The longitudinal axis could also correspond to an axis parallel only to one of the two edges BG or BD. The transverse axis is the axis of the traffic lane perpendicular to the longitudinal axis. The adjective "lateral" characterizes an object following the transverse axis. Thus, the lateral position of the vehicle designates the position of the vehicle following the transverse axis.

Figure 3:
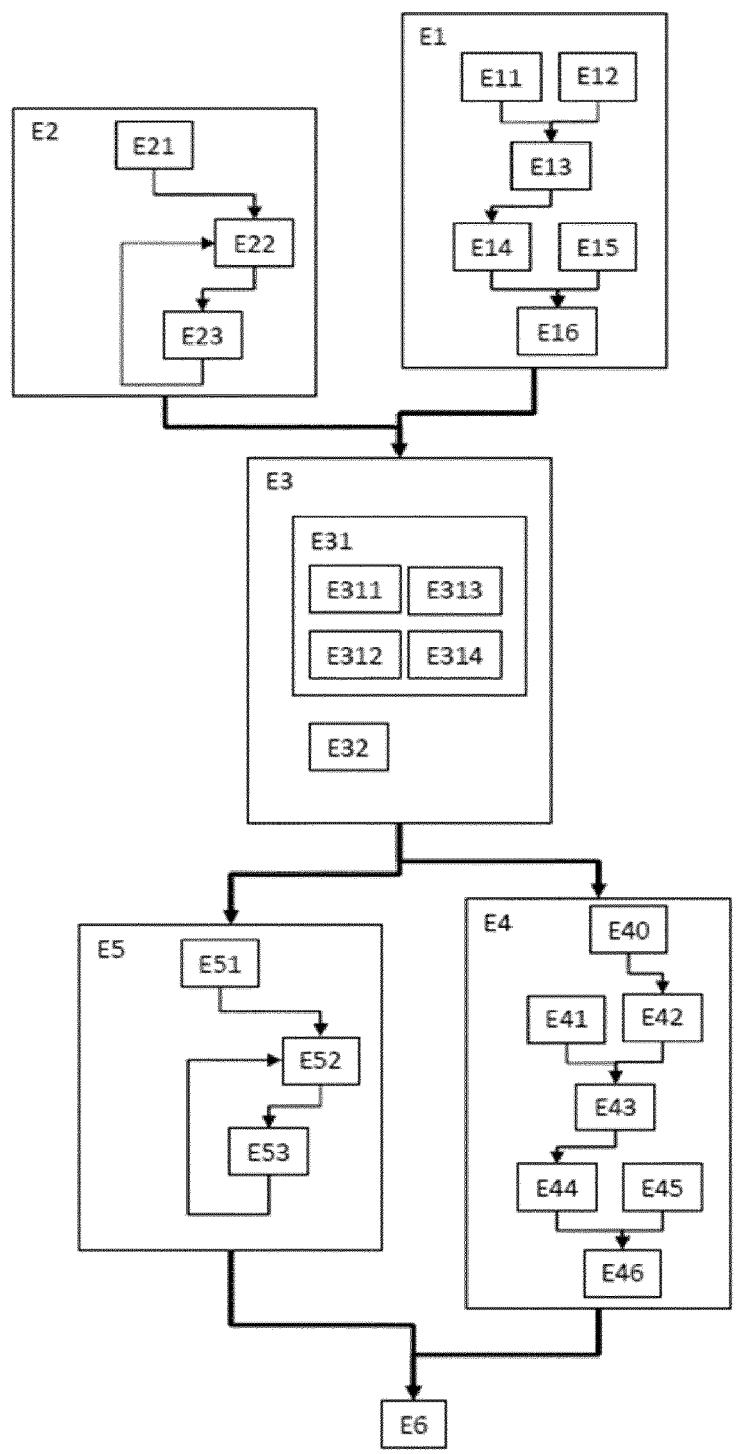
FIG. 3 is a block diagram of a method for controlling the lateral position of the vehicle on the traffic lane according to one embodiment of the invention.

One embodiment of a method for controlling the lateral position of the vehicle 1 on the traffic lane 10 will now be described with reference to FIG. 3.

In a first step E1, there is carried out automatic control of the position of the vehicle following a first reference trajectory TR1. The first reference trajectory can be defined substantially at the center of the traffic lane. It can therefore correspond to the median line LM. In other words, the lateral position of the vehicle is controlled so as to follow the median line LM.

Figure 4:
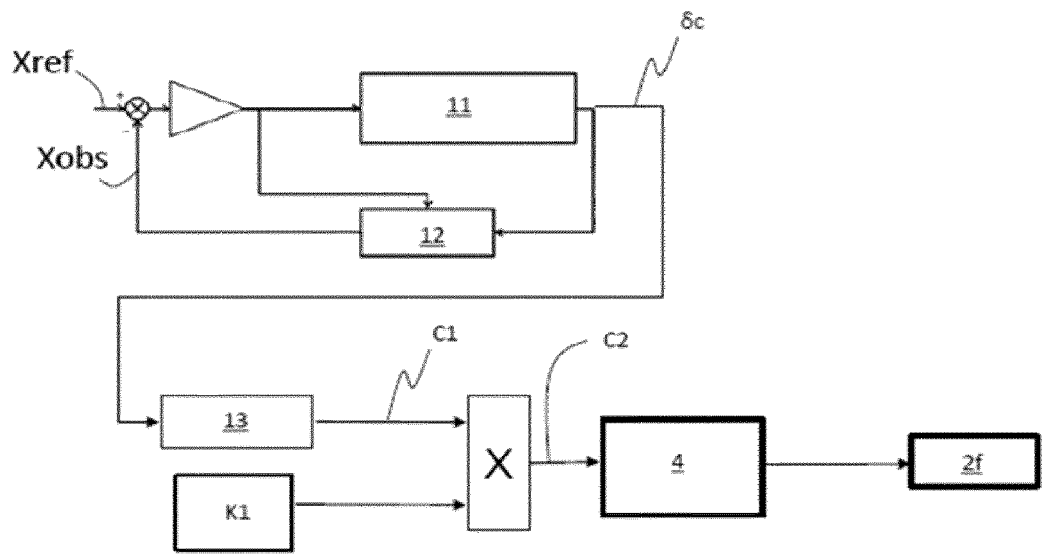
FIG. 4 is a schematic view of a controller employed in a step of controlling the lateral position of the vehicle.

The automatic control of the lateral position of the vehicle following the reference trajectory TR1 can be carried out by means of a closed-loop algorithm as shown schematically in FIG. 4. The first control step E1 thus comprises a substep E11 of calculating a reference state vector Xref of the vehicle, a substep E12 of calculating an observed state vector Xobs of the vehicle, and a substep E13 of calculating a setpoint of a steering angle δc of the steered wheels of the vehicle according to the difference between the reference state vector Xref and the observed state vector Xobs. Next, the setpoint of a steering angle δc is used for the calculation of the observed state vector Xobs during a following iteration of the first step E1.

The reference state vector Xref describes the desired position and trajectory for the vehicle. This state vector can be calculated in particular according to the first reference trajectory TR1, that is to say the median line LM. As the vehicle 1 experiences various disturbances resulting from factors which are internal or external to the vehicle 1, the reference state vector Xref at a given instant can be different from the observed state vector Xobs of the vehicle. These internal or external factors may be, for example, variations in the grip of the vehicle, loading variations, deformations of the roadway, the impact of the wind, or the precision of the detection means 8.

The observed state vector Xobs can be calculated from sensors installed in the vehicle, in particular from detection means 8, and from a kinematic model of the vehicle (identified by 11 in FIG. 4) and an observer (identified by 12 in FIG. 4). The observed state vector Xobs can comprise all or part of the following seven components:

a yaw speed of the vehicle, and/or
a heading angle of the vehicle, and/or
a lateral speed of the vehicle, and/or
a lateral deviation of the vehicle with respect to the reference trajectory, and/or
a steering speed of the steered wheels of the vehicle, and/or
a steering angle of the steered wheels of the vehicle, and/or
an integral of the lateral deviation of the vehicle with respect to the reference trajectory.

The first control step E1 then comprises a substep E14, during which a first torque C1 is calculated. This first torque C1 is calculated according to the previously calculated steering angle setpoint δc and by means of a PID controller 13, that is to say a proportional-integral-derivative controller.

The first control step E1 also comprises a substep E15 during which a gain K1 of between 0 and 1 is calculated. Advantageously, the gain K1 can be a decreasing function of the torque applied to the steering wheel 5 by the driver. In other words, the higher the torque applied by the driver to the steering wheel 5, the lower will be the gain K1.

Finally, the first control step E1 comprises a substep E16 in which there is calculated a torque C2 to be applied to the steered wheels 2f by a multiplication of the torque C1 with the gain K1. The torque C2 thus obtained can then be provided to the steering device 4 in order to orient the steered wheels.

The vehicle 1 can therefore be controlled according to several operating modes: in a first mode, termed manual mode and corresponding to a value of the gain K1 equal to 0, the orientation of the steered wheels 2f is controlled only by the driver. In a second mode corresponding to a value of the gain K1 equal to 1, the torque C2 transmitted to the steered wheels is sufficient to follow the first reference trajectory. Finally, in a third operating mode, in which the gain K1 is between 0 and 1 exclusive, the torque C2 transmitted to the steered wheels is insufficient to follow the first reference trajectory. However, the torque C2 is felt by the driver via gripping the steering wheel and is interpreted as a prompt to orient the steering wheel to follow the first reference trajectory TR1. The steering torque actually applied to the steered wheels 2f then results from the sum of the torque C2 and of the torque transmitted to the steered wheels by the action of the driver on the steering wheel. The control of the lateral position of the vehicle is considered to be automatic as long as the gain K1 is strictly greater than 0.

In parallel to the first control step E1, the method comprises a first step E2 of monitoring the lateral distance separating the vehicle from the edges BG and BD of the traffic lane.

Figure 6:
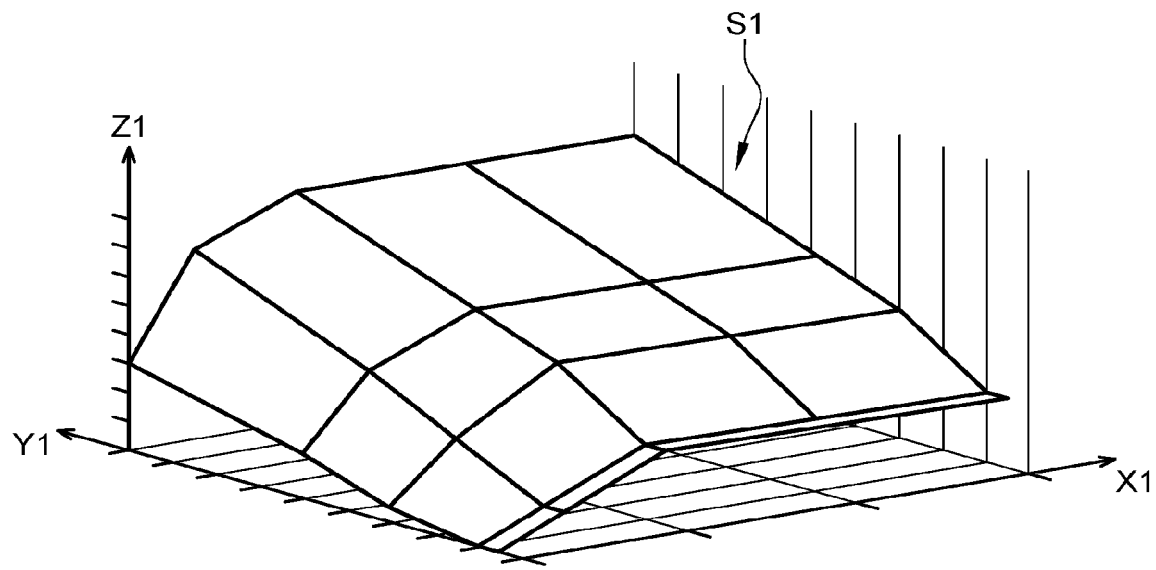
FIG. 6 is a graph illustrating the parameterization of a first threshold.

The first monitoring step E2 first of all comprises a substep E21 of calculating the first threshold S1. In particular, the first threshold S1 can be calculated according to a width of the traffic lane 10 and according to a lateral speed of the vehicle 1 on the traffic lane 10. The first threshold can be determined so as to observe a standard imposing a driver alert in the case of drift of the vehicle. The width of the traffic lane can be the distance separating the edges BG and BD of the traffic lane at the height of the vehicle 1 or at a given distance in front of the vehicle 1. It can be calculated by virtue of the detection means 8. The lateral speed of the vehicle 1 designates the speed of the vehicle following the transverse axis Y, that is to say the speed at which it approaches the edge BG or BD. FIG. 6 illustrates one example of mapping of the first threshold S1. The axis X1 designates the lane width, for example of between 2.5 m and 4 m. The axis Y1 designates the lateral speed of the vehicle 1 in terms of absolute value, for example of between 0 and 1.8 m/s. The axis Z1 designates the threshold S1 obtained, with it being possible for the latter to be, for example, between 10 cm and 30 cm approximately. The threshold S1 can be an increasing function of the lateral speed and an increasing function of the width of the lane. Advantageously, the threshold S1 is identical at the left and right of the traffic lane, but, in a variant, it could be different.

The first monitoring step E2 comprises a substep E22 of alerting the driver if the lateral distance separating the vehicle from the edge BD or BG of the traffic lane becomes less than or equal to the previously calculated first threshold S1. The driver is alerted by activating the alert means 9. Thus, the driver is warned that the action of the steering device 4 on the steered wheels 2f is insufficient to follow the first reference trajectory TR1. He can therefore act on the steering wheel 5 to recenter the vehicle on the traffic lane. Thus, a regulatory requirement is satisfied that consists in alerting the driver if the vehicle comes too close to the edges of the traffic lane.

In a third substep E23, the alert given to the driver is stopped if the lateral distance separating the vehicle from the edge BD or BG of the traffic lane becomes or rebecomes greater than or equal to a third threshold S3. The third threshold S3 is strictly greater than the first threshold S1. The third threshold S3, which can be referred to as resetting threshold, can be defined according to the width of the traffic lane and according to its curvature. Untimely activations and deactivations of the alert means 9 are thus avoided.

While the position of the vehicle is controlled to follow the first reference trajectory, the driver may wish to offset his vehicle to one side of the traffic lane to anticipate any form of risk. For example, if he overtakes a truck to the left, he may wish to offset his vehicle toward the left of the traffic lane in order to increase the lateral distance separating it from the truck. If a motor cycle or an emergency vehicle is preparing to overtake it to the left, he may wish to offset his vehicle toward the right to leave a sufficient passage. The driver may also wish to offset his vehicle simply to be offset with respect to the vehicle preceding it on the traffic lane and thus improve his view of the road in front of the vehicle. In order to offset his vehicle, the driver therefore exerts a command, in the form of a torque applied to the steering wheel 5, to direct his vehicle in the desired direction.

The control method then comprises a step E3 of detecting the command applied to the steering wheel 5 by the driver. The lateral deviation of the vehicle with respect to the first reference trajectory and also the torque applied to the steering wheel 5 are then observed. As will be seen below, the lateral deviation with respect to the reference trajectory serves as a basis for the definition of a second reference trajectory TR2. Before that, the detection step E3 may comprise a substep E31 of verifying various criteria relating to said command applied by the driver.

The verification step E31 may comprise a substep E311 of comparing a lateral deviation of the vehicle with a minimum lateral deviation threshold. This minimum threshold, the value of which may for example be fixed to 10 cm, makes it possible to filter involuntary shifting of the driver with respect to the first reference trajectory TR1. Thus, as long as the action of the driver on the steering wheel leads to a deviation of the vehicle by less than 10 cm with respect to the reference trajectory, the first control step E1 will be continued and the vehicle will continue to follow the first reference trajectory TR1.

The verification step E31 may also comprise a substep E312 of comparing the lateral deviation of the vehicle with a maximum lateral deviation threshold. This maximum threshold may be defined according to the lateral acceleration of the vehicle, according to the speed of the vehicle, according to the width of the traffic lane and according to the width of the vehicle. In particular, this maximum threshold may be an increasing function of the width of the lane and/or a decreasing function of the width of the vehicle, of the speed of the vehicle and of the lateral acceleration. By defining a maximum threshold, the second reference trajectory is prevented from being excessively offset with respect to the center of the traffic lane. Thus, if the driver's command leads to an excessive lateral deviation, this command will not lead to the definition of a second reference trajectory.

The verification step E31 may also comprise a substep E313 of comparing the torque applied to the steering wheel with a minimum torque threshold. This minimum threshold can be defined according to the longitudinal speed of the vehicle and according to the curvature of the traffic lane. It may thus be comprised, for example, between 0.8 Nm and 1.6 Nm. In a variant, this minimum torque threshold could be equal to a fixed value, for example defined at 1.5 Nm. It makes it possible to filter the involuntary actions of the driver on the steering wheel. For example, if the driver temporarily releases the steering wheel from one of his two hands, a weak variation in the torque transmitted to the steering wheel can be detected without, however, corresponding to an intention of the driver to offset his vehicle. However, the first control step E1 will be continued and the vehicle will continue to follow the first reference trajectory.

The verification step E31 may also comprise a substep E314 of comparing the torque applied to the steering wheel of the vehicle with a maximum torque threshold. This maximum torque threshold may, for example, be defined at 4 Nm. If the driver exerts such a torque on the steering wheel, which can be interpreted as an emergency command, in particular an avoidance maneuver, the control method may then be deactivated so as to allow the driver to completely control the direction of the vehicle.

Time periods can be applied to each of the substeps E311, E312, E313 and E314 to ensure that the criterion is verified for a minimum duration. It is possible, for example, to use a low-frequency filter to filter the lateral deviation measurements of the vehicle and/or the values of torque applied to the steering wheel. It is also possible to use a counter and verify that the condition is observed during a sufficiently large number of iterations of the method.

If all of the criteria verified during the verification step E31 are satisfied, then the lateral deviation separating the vehicle 1 from the first reference trajectory can be stored and used as a lateral offset OL to define a second reference trajectory TR2. The second reference trajectory TR2 is therefore substantially parallel to the first reference trajectory TR1 and offset therefrom by the value of the lateral offset OL. Thus, the detection step E3 can comprise a substep E32 of determining the lateral offset OL. This determination step E32 can comprise the detection of an increase followed by a stabilization of the torque applied to the steering wheel by the driver. The lateral offset then corresponds to the lateral deviation obtained after stabilization of the torque applied to the steering wheel. The torque can be considered as stabilized from the moment when it becomes less than or equal to a threshold value defined by parameterization, for example a value of the order of 0.7 Nm. There can also be provided a deactivation of the control method if the torque is not stabilized at the end of a duration fixed by parameterization, for example a duration of the order of 10 seconds. In a variant, the lateral offset could also be determined by observing an increase followed by a stabilization of another state parameter of the vehicle. This state parameter can, for example, be the lateral deviation with respect to the first reference trajectory TR1, the heading angle of the vehicle or else the lateral speed of the vehicle.

Finally, the lateral offset OL is defined by virtue of the action of the driver on the steering wheel. It therefore results from a choice of the driver and not from an automatic definition. The driver can therefore freely define a lateral offset value of his vehicle according to his requirements and the traffic conditions.

Next, in a second control step E4, the position of the vehicle is controlled automatically following the second reference trajectory TR2. Of course, this step is implemented if and only if the criteria tested during the verification step E31 are satisfied.

The control of the lateral position of the vehicle following the second reference trajectory TR2 can be carried out in an identical manner to the control of the lateral position of the vehicle following the first reference trajectory TR1. Thus, the second control step E4 can comprise substeps E41, E42, E43, E44, E45, E46 which are identical to the above-described steps E11, E12, E13, E14, E15, E16, apart from the difference that the first reference trajectory TR1 is replaced by the second reference trajectory TR2. Thus, the driver can follow the second reference trajectory TR2 without having to exert a torque on the steering wheel to counteract a torque generated by the steering device 4 that would tend to return the vehicle toward the first reference trajectory TR1. The guiding of the vehicle 1 is therefore more pleasant and more precise.

In parallel with the second control step E4, the method comprises a second step E5 of monitoring the lateral distance separating the vehicle from the edges BG and BD of the traffic lane. The second monitoring step E5 is also carried out in an analogous manner to the first monitoring step E2. It therefore comprises substeps E51, E52 and E53 corresponding to the above-described substeps E21, E22 and E23. However, the second monitoring step E5 is distinguished from the first monitoring step E1 in that the first threshold S1 is replaced by the second threshold S2, which is strictly less than the first threshold S1. In other words, during the second control step E4, the vehicle is allowed to come closer to the edges BG or BD before triggering a driver alert. This makes it possible to avoid triggering inappropriate driver alerts, since the offsetting of the vehicle is intentional. There is nevertheless maintained an alert means if the vehicle comes too close to a lateral edge BG, BD. The alert given to the driver during the step E52 can be identical to the alert given to the driver during the step E22. In a variant, this alert could be different, for example, more intense, taking into account the proximity with the edge BG or BD of the traffic lane.

The first monitoring step E2 is stopped as soon as the second monitoring step E5 is activated. This transition between the two monitoring steps can be produced when the criteria tested during the verification step E31 are satisfied. There is thus at any time at least one threshold S1 or S2 which, when crossed, leads to a driver alert.

Figure 7:
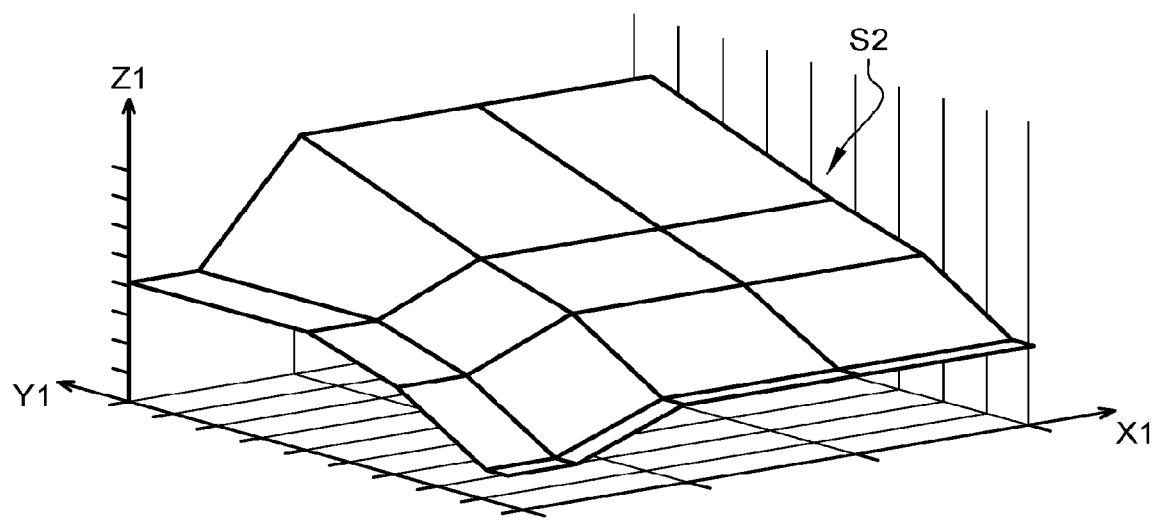
FIG. 7 is a graph illustrating the parameterization of a second threshold.

FIG. 7 illustrates an example of mapping of the second threshold S2. The axis X1 designates the lane width, for example between 2.5 m and 4 m. The axis Y1 designates the lateral speed of the vehicle 1 approaching the edge in question, for example between 0 and 1.8 m/s. The axis Z1 designates the threshold S2 obtained, which can be, for example, between 0 and 20 cm approximately. The threshold 2 can be an increasing function of the lateral speed and an increasing function of the width of the lane. Advantageously, the threshold S2 is identical at the left and right of the traffic lane but, in a variant, it could be different. Note that the threshold S2 is independent of the lateral offset OL.

In addition to the alert given to the driver in the event of crossing the thresholds S1 or S2, there can be provided a step of automatically recentering the vehicle to re-establish a lateral distance from the edge BG or BD strictly greater than the threshold S1 or S2, respectively.

Figure 5:
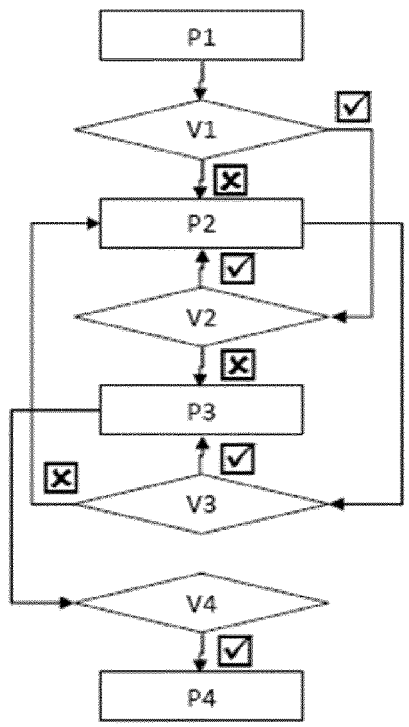
FIG. 5 is a diagram of activities illustrating a method of alerting the driver in the case of lateral drift of the vehicle.

FIG. 5 illustrates a method for alerting the driver in the case of lateral drift of the vehicle. The state P1 corresponds to an activation state of the method for controlling the lateral position of the vehicle. From the state P1, there is carried out a first test V1 consisting in determining if the vehicle has reached the first threshold S1, or in other words if one of its edges has reached one of the lines LS1G or LS1D. If the lateral distance separating the vehicle from an edge BD or BG remains strictly greater than the threshold S1, the vehicle remains in a state P2 in which no alert is given. On the other hand, if the lateral distance becomes less than or equal to the threshold S1, then there is carried out a second test V2 consisting in determining if a torque is exerted on the steering wheel 5 of the vehicle. If a torque is exerted on the steering wheel 5 of the vehicle, the vehicle remains in the state P2 in which no alert is given. By contrast, if no torque is exerted on the steering wheel 5 of the vehicle, the vehicle passes into a state P3 in which a driver alert is triggered. From the state P2, there is carried out a third test V3 consisting in determining if the vehicle has reached the second threshold S2, or in other words if one of its edges has reached one of the lines LS2G or LS2D. If the lateral distance separating the vehicle from an edge BD or BG remains strictly greater than the threshold S2, the vehicle remains in the state P2 in which no alert is given. On the other hand, if this lateral distance becomes less than or equal to the threshold S2, then the vehicle passes into a state P3 in which a driver alert is triggered.

In other words, if the threshold S1 is reached, the driver is alerted only in the absence of torque exerted on the steering wheel. If the threshold S2 is reached, the driver is alerted in all cases.

From the state P3, there is carried out a fourth test V4 consisting in determining if the vehicle has reached the third threshold S3, or in other words if the vehicle has returned into the space defined between the lines LS3G or LS3D. As long as this is not the case, the driver alert is maintained. If this is indeed the case, the driver alert is stopped.

According to an original aspect of the invention, the second control step E4 comprises a transition step E40 executed at the start of the second control step E4. The transition step E40 aims to provide a smooth transition, without overshoot, and without jerkiness between the two reference trajectories TR1, TR2. The transition step E40 comprises the replacement of a component of the observed state vector Xobs of the vehicle by a component calculated such that the steering angle setpoint δc of the steered wheels of the vehicle is equal to a current value of the steering angle δm, that is to say a value of the steering angle of the steered wheels measured at the moment of execution of the transition step E40. In particular, the component of the state vector corresponding to the integral of the lateral deviation of the vehicle with respect to the reference trajectory can be replaced by a value calculated in such a way that the steering angle setpoint δc of the steered wheels of the vehicle is equal to a current value of the steering angle δm.

By virtue of the invention, the driver can offset his vehicle in the traffic lane both without effort and without untimely triggering of a positioning alert.

According to another particular feature of the invention, the control method comprises temporarily maintaining the second control step E4, then automatically, a third step E6 of automatically controlling the position of the vehicle following the first reference trajectory TR1. The second control step R4 can be maintained for a duration predefined by calibration. This duration can correspond to the average duration of an overtaking maneuver, for example of the order of around a minimum of ten seconds. In a variant, the return to the first reference trajectory could be triggered automatically subsequent to the detection of the end of an overtaking maneuver. At the end of this predefined duration, the vehicle can therefore automatically resume a centered position on the traffic lane, following the first reference trajectory. Advantageously, a transition step analogous to the above-described transition step E40 can be provided in order to obtain a change of reference trajectory without jerkiness.

During the control, the lateral position of the vehicle can fluctuate, the reference trajectory followed. These fluctuations, which can be of the order of 10 cm, may be due to the various factors internal or external to the vehicle as has been mentioned above. A safety margin parameterized as a function of the speed of the vehicle can be defined. Advantageously, the second reference trajectory TR2 is defined by taking account of this safety margin. Thus, the second reference trajectory can be defined at a distance from the lines LS2G or LS2D that is at least greater than or equal to the safety margin.

The invention claimed is:

1. A method for controlling a lateral position of a vehicle on a traffic lane, the method comprising:
    during a first period:
    automatically controlling the lateral position of the vehicle within the traffic lane to follow a first reference trajectory, and
    monitoring, while automatically controlling the lateral position of the vehicle within the traffic lane to follow the first reference trajectory, a lateral distance separating the vehicle from an edge of the traffic lane, and alerting a driver of the vehicle when the lateral distance separating the vehicle from the edge of the traffic lane is less than or equal to a first threshold;
    then
    detecting a command applied to a steering wheel of the vehicle by a driver for shifting the vehicle toward an edge of the traffic lane; then
    stopping the first period; and
    during a second period:
    automatically controlling the lateral position of the vehicle within the traffic lane to follow a second reference trajectory, the second reference trajectory being determined according to the command applied to the steering wheel by the driver, and
    monitoring, while automatically controlling the lateral position of the vehicle within the traffic lane to follow the second reference trajectory, the lateral distance separating the vehicle from an edge of the traffic lane, and alerting the driver when the lateral distance separating the vehicle from the edge of the traffic lane is less than or equal to a second threshold, the second threshold being less than the first threshold.

2. The control method as claimed in claim 1, further comprising at least one of:
    calculating the first threshold according to a width of the traffic lane and according to a lateral speed of the vehicle on the traffic lane, and
    calculating the second threshold according to the width of the traffic lane and according to the lateral speed of the vehicle on the traffic lane.

3. The control method as claimed in claim 1, further comprising stopping the alert given to the driver when the lateral distance separating the vehicle from the edges of the traffic lane is greater than or equal to a third threshold, the third threshold being greater than the first threshold.

4. The control method as claimed in claim 1, wherein the automatically controlling during the first period or the automatically controlling during the second period comprises:
    calculating a first steering torque of steered wheels of the vehicle,
    calculating a gain, the gain being a decreasing function of a torque applied to the steering wheel by the driver,
    calculating a second steering torque of the steered wheels of the vehicle by a multiplication of the first torque and of the gain.

5. The control method as claimed in claim 1, further comprising verifying at least one criterion relating to said command, said automatically controlling during the second period being implemented in response to the at least one criterion being satisfied, the verifying at least one criterion comprising at least one of:
    comparing a lateral deviation of the vehicle with respect to the first reference trajectory with a minimum lateral deviation threshold,
    comparing the lateral deviation of a vehicle with respect to the first reference trajectory with a maximum lateral deviation threshold,
    comparing a torque applied to the steering wheel of the vehicle with a minimum torque threshold, and
    comparing the torque applied to the steering wheel of the vehicle with a maximum torque threshold.

6. The control method as claimed in claim 1, further comprising determining a lateral offset of the vehicle with respect to the first reference trajectory subsequent to the command applied to the steering wheel by the driver, the second reference trajectory being defined according to the first reference trajectory and the lateral offset, the determination comprising a detection of an increase followed by a stabilization of a torque applied to the steering wheel by the driver and/or a detection of an increase followed by a stabilization of a state parameter of the vehicle.

7. The control method as claimed in claim 1, wherein the automatically controlling during the second period comprises:
    calculating a reference state vector of the vehicle,
    calculating an observed state vector of the vehicle,
    calculating a setpoint of a steering angle of steered wheels of the vehicle according to a difference between the reference state vector and the observed state vector, and
    transitioning at a start of the second period, the transitioning comprising replacing a component of an observed state vector of the vehicle with a component calculated such that a steering angle setpoint of the steered wheels of the vehicle is equal to a current value of the steering angle of the steered wheels.

8. The control method as claimed in claim 1, further comprising:
    temporarily maintaining the automatically controlling during the second period, then, during a third period, automatically controlling the position of the vehicle to follow the first reference trajectory.

9. A non-transitory computer readable medium storing a program that, when executed by a computer, causes the computer to execute the control method as claimed in claim 1.

10. A motor vehicle, comprising:
steered wheels connected to a steering wheel, means for detecting an environment of the vehicle, means for alerting a driver of the vehicle, and at least one computer configured to implement the control method as claimed in claim 1.

* * * * *